E. BARTH.
TRACK FOR CARRIAGE DOORS.
APPLICATION FILED APR. 13, 1907.
950,089.
Patented Feb. 22, 1910.
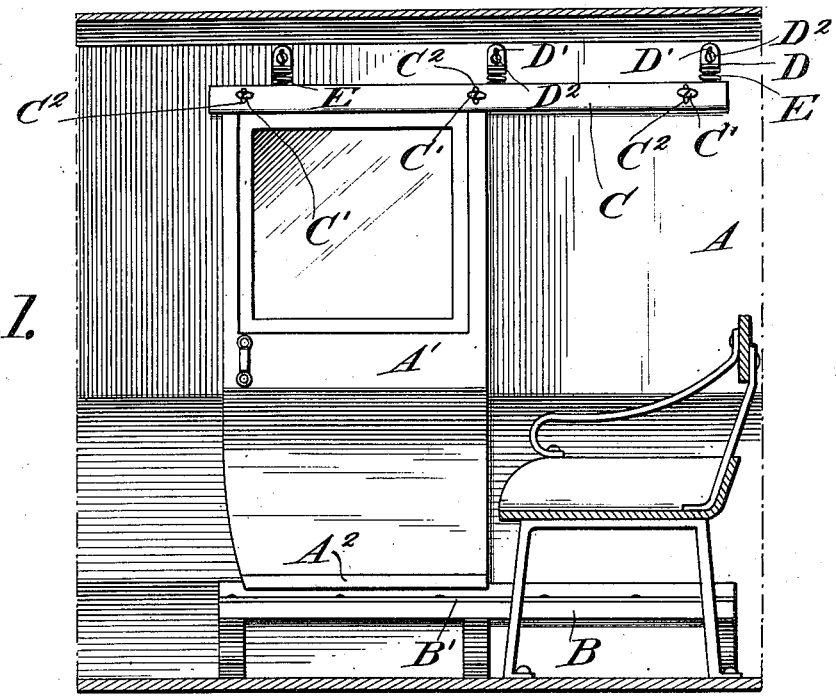
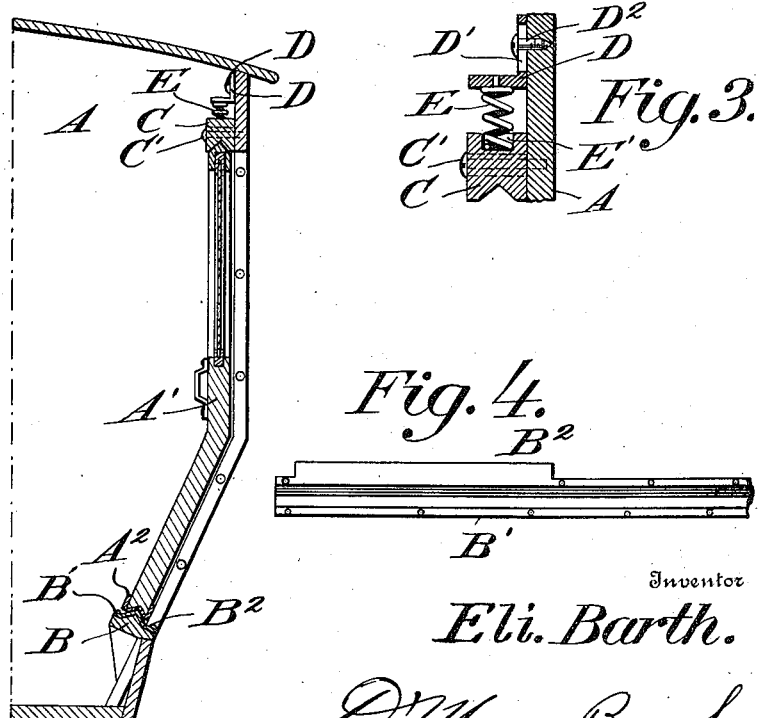

UNITED STATES PATENT OFFICE.

ELI BARTH, OF NEVADA, OHIO.

TRACK FOR CARRIAGE-DOORS.

950,089.  Specification of Letters Patent.  Patented Feb. 22, 1910.

Application filed April 13, 1907. Serial No. 367,982.

*To all whom it may concern:*

Be it known that I, ELI BARTH, a citizen of the United States, residing at Nevada, in the county of Wyandot and State of Ohio, have invented a new and useful Improvement in Tracks for Carriage-Doors, of which the following is a specification.

This invention relates to a track for sliding doors and is an improvement upon the door and track construction shown by me in an application for a patent for a storm cab, filed February 6, 1907, and having Serial Number 356,048.

The object of the present improvement is to prevent rattling of the door and also to prevent the door from sliding upon the track or "creeping" by reason of jar when the vehicle is driven over rough roads. It will also be obvious that when the vehicle is driven up or down a grade a certain amount of inclination will be given the tracks between which the door slides and this would also increase the tendency of the door to move along the tracks.

This invention consists of the lower track upon which the door travels, and an upper track engaging the upper edge of the door and having a certain limited vertical movement, the upper track being pressed down upon the door by means of suitable springs. The door is thereby held by pressure between the upper and lower tracks thus preventing creeping of the door.

In the accompanying drawings, Figure 1 is a vertical section taken longitudinally through the body portion of a cab and showing in elevation the door and tracks. Fig. 2 is a section taken transversely through one-half of the cab body showing the door and tracks in section. Fig. 3 is an enlarged transverse section through the upper track and through the track carried by the side of the cab. Fig. 4 is a detail perspective view of a portion of the lower track.

In these drawings A represents the cab or other vehicle and A' the sliding door which is angled as described in the application for a patent above referred to. The lower track B is formed of a suitable braced wooden rail substantially triangular in cross-section and over this rail is fitted a substantially V-shaped metal plate B' forming the track proper and upon one side of this metal portion of the track is formed a longitudinal flange $B^2$ which registers with the door-way and serves as a metal sill, forming a wear-plate for the doorway. The lower edge of the door has a V-shaped groove formed therein and is shod with a metal shoe $A^2$ bent to fit in said groove, and receiving the V-shaped portion of the track B'. A track rail C is provided upon its under face with a V-shaped groove into which fits the upper beveled edge of the door. This construction prevents any rattling of the door, and in order to prevent creeping, I provide the following means for regulating the pressure of the upper track C upon the upper edge of the door:—The track section C is held to the wall of the cab by bolts or screws C', which pass through slots $C^2$ formed in the track C so that a limited vertical movement of this track section is permitted. Above the track C and to the side of the cab, I secure a number of adjustable brackets D, said brackets being angled and their upright portions being vertically slotted as shown at D'. These brackets are held in position by screws $D^2$ which work through the slots, the heads bearing upon the brackets. Coil springs E have their lower ends fitted into sockets E' cut in the upper portion of the track C and the upper ends of the springs are inserted into suitable perforations formed in the horizontal portions of the brackets D.

It will be obvious that by loosening the screws $D^2$ the brackets D may be raised or lowered, thus decreasing or increasing the action of the springs E and regulating the force with which they bear upon the vertical movable track section C. By reason of this adjustment the track section C may be regulated so that it will bear sufficiently upon the door to prevent any accidental sliding of the same upon the track sections by rocking movement or jars of the vehicle body, but at the same time will permit it to be readily opened and closed by the occupant of the vehicle. This construction also permits for re-adjustment of the brackets D to take up wear or to allow for a decrease in the efficiency of the springs E.

Having thus fully described my invention, what I claim as new and desire to secure by Letters Patent, is:—

The combination with a slidable carriage door, of upper and lower tracks between which the door slides, the upper track being movable vertically, angled slotted brackets arranged above the upper track, springs arranged between the track and said brackets and screws working through slots of the brackets and locking the same in adjusted position.

ELI BARTH.

Witnesses:
 Jacob Gonguer,
 E. Miller.